(12) United States Patent
Sinkoff

(10) Patent No.: US 7,057,812 B2
(45) Date of Patent: Jun. 6, 2006

(54) REFLECTION-TYPE PROJECTION SCREEN

(76) Inventor: Howard Sinkoff, 2741 NE. 4th Ave., Pompano Beach, FL (US) 33064

( * ) Notice: Subject to any disclaimer, the term of this patent is extended or adjusted under 35 U.S.C. 154(b) by 85 days.

(21) Appl. No.: 10/719,356

(22) Filed: Nov. 21, 2003

(65) Prior Publication Data

US 2004/0100691 A1    May 27, 2004

Related U.S. Application Data

(63) Continuation-in-part of application No. 10/125,628, filed on Apr. 17, 2002, now Pat. No. 6,724,529.

(51) Int. Cl.
*G03B 21/56* (2006.01)
*G03B 21/60* (2006.01)
*G02B 27/10* (2006.01)

(52) U.S. Cl. ............... 359/449; 359/455; 359/459; 359/619

(58) Field of Classification Search ......... 359/449, 359/443, 455, 459, 619, 627, 617
See application file for complete search history.

(56) References Cited

U.S. PATENT DOCUMENTS

| | | | | |
|---|---|---|---|---|
| 1,985,460 A | 12/1934 | Raven | ............ | 359/445 |
| 2,968,219 A | * 1/1961 | Saiia | ............ | 359/443 |
| 3,314,742 A | 4/1967 | Morgan | ............ | 359/443 |
| 3,492,060 A | 1/1970 | Sherwood | ............ | 359/443 |
| 3,510,197 A | 5/1970 | Seki et al. | ............ | 359/461 |
| 3,598,470 A | 8/1971 | Vetter | ............ | 359/455 |
| 3,653,740 A | 4/1972 | Ogura et al. | ............ | 359/443 |
| 3,964,822 A | 6/1976 | Yamashita | ............ | 359/443 |
| 4,006,965 A | 2/1977 | Takada et al. | ............ | 359/443 |
| 4,025,160 A | 5/1977 | Martinez | ............ | 359/443 |
| 4,040,717 A | 8/1977 | Cinque et al. | ............ | 359/454 |
| 4,089,587 A | * 5/1978 | Schudel | ............ | 359/451 |
| 4,190,320 A | 2/1980 | Ferro | ............ | 359/459 |
| 4,201,449 A | 5/1980 | Campion et al. | ............ | 359/443 |
| 4,232,939 A | 11/1980 | Kikuchi | ............ | 359/459 |

(Continued)

OTHER PUBLICATIONS

Neun Punkt GbR and Wolfgang Schoelermann, "Latest News about Audio-Visual-Presentations (AVP)", Aug. 22, 2003, pp. 1 and 5, http://www.avp-newsletter.com/avpe3403.htm, CREACT Hamburg, Germany.

*Primary Examiner*—W. B. Perkey
*Assistant Examiner*—Magda Cruz
(74) *Attorney, Agent, or Firm*—Kevin P. Crosby; Daniel C. Crilly; Brinkley, McNerney et al.

(57) ABSTRACT

A projection screen includes a substrate having at least a first surface, a reflective layer having a first surface and an opposing second surface, and diffusion layer having a first surface defined by a matte finish and an opposing second surface. The second surface of the reflective layer is attached (e.g., via an adhesive) to the first surface of the substrate and the second surface of the diffusion layer is attached (e.g., via an optically transparent adhesive) to the first surface of the reflective layer. The projection screen is preferably flexible and wound around a conventional roller to form a projection screen system. Alternatively, the projection screen may be attached to a rigid substrate. The second surface of the diffusion layer has a preferably smooth finish, but may include desired irregularities to achieve a desired screen directivity performance.

32 Claims, 5 Drawing Sheets

U.S. PATENT DOCUMENTS

| | | | |
|---|---|---|---|
| 4,431,720 A | 2/1984 | Sugarman | 430/17 |
| 4,792,209 A | 12/1988 | Laine et al. | 359/443 |
| 5,127,722 A * | 7/1992 | Nishitani | 359/443 |
| 5,148,309 A | 9/1992 | Yamada et al. | 359/443 |
| 5,361,163 A | 11/1994 | Matsuda et al. | 359/452 |
| 5,456,967 A * | 10/1995 | Nezu | 428/141 |
| 5,780,140 A | 7/1998 | Nilsen | 428/172 |
| 5,914,825 A | 6/1999 | Nishio et al. | 359/851 |
| 6,040,941 A | 3/2000 | Miwa et al. | 359/443 |
| 6,144,491 A | 11/2000 | Orikasa et al. | 359/452 |
| 6,163,402 A | 12/2000 | Chou et al. | 359/443 |
| 6,233,095 B1 | 5/2001 | Niwa et al. | 359/443 |

* cited by examiner

REFLECTION-TYPE PROJECTION SCREEN

CROSS-REFERENCE TO RELATED APPLICATIONS

This application is a continuation-in-part of U.S. application Ser. No. 10/125,628 filed Apr. 17, 2002, now U.S. Pat. No. 6,724,529 and hereby claims priority upon such application under 35 U.S.C. § 120.

BACKGROUND OF THE INVENTION

This invention relates to reflection-type projection screens. More particularly, the invention relates to reflection-type projection screens having excellent reflection directivity in the horizontal and vertical directions yet which produce a reflected image having superior gain and contrast.

The desirability of producing reflection-type projection screens having a wide angle of reflectivity with suitable contrast is well known. In settings such as movie theaters and home viewing areas, the viewer is often times positioned at a significant angle with respect to the direction of the projected image from the projector, i.e. the direction of incident projected light. Therefore, the screen must have an effective viewing angle greater than would be producible if a highly reflective medium were used alone.

Numerous attempts have been made to remedy this problem. U.S. Pat. No. 3,653,740 to Ogura ("'740 Patent") discloses a projection screen having a double rolled aluminum foil sheet attached to a support member, and a brushed resin film covering the foil as a protective coating against scratching, fingerprints, etc. No mention is made of the brushing techniques used or of the resulting surface characteristic of the resin film after it is brushed.

U.S. Pat. No. 6,144,491 to Orikasa ("'491 Patent") discloses a reflection-type projection screen having a substrate, a light reflecting layer made from a transparent resin in which flakes of a light-reflective material are dispersed, and a transparent light-diffusing layer made from a transparent resin in which fine crystalline particles of calcite and a pigment are dispersed. The films of '491 Patent are complicated, expensive and particularly difficult to achieve.

U.S. Pat. No. 6,040,941 to Miwa ("'941 Patent") discloses a reflection-type projection screen having a light-reflecting substrate laminated to a light-transmitting polymer layer having light absorptive slits or "crazes" of regular directionality disposed therein. The slits are filled with a light-absorbing substance such as a black pigment or dye.

U.S. Pat. No. 6,233,095 BI to Niwa ("'095 Patent") discloses a reflex-type screen comprised of a first layer formed integrally with an inner reflex layer on a surface of a substrate, and a second layer formed of a deflection film bonded to a surface of the first layer. The screen of the '095 Patent was developed to facilitate the use of screens which can be deflected, e.g. rolled up when not in use. Beads such as acrylic or silicon beads are applied to the substrate surface prior to deposition of a metal reflective layer, rendering the process of attaching the metal reflective layer all the more complicated.

U.S. Pat. No. 5,456,967 to Nezu ("'967 Patent") discloses a reflection-type screen of the type that can be wound up in a roll form and unwound as needed and comprises a substrate sheet to which is laminated a high-density light diffusion-reflection layer and a translucent light diffusion layer including a soft vinyl chloride sheet, the translucent light diffusion layer having a surface provided with a light-diffusing fine uneven pattern.

U.S. Pat. No. 5,361,163 to Matsuda ("'163 Patent") discloses a reflection-type projection screen comprising a dark plastic substrate, a fibrous sheet of glass fibers, a white, opaque base material sheet and a light diffusing layer of a translucent plastic onto which a lustrous pigment or calcite powder is incorporated. An emboss is formed on the outer surface of the light diffusion layer. Light absorbing strips are provided each at a position corresponding to a concave portion of the emboss on the surface of the base material sheet adjoining the light diffusing layer.

U.S. Pat. No. 5,148,309 to Yamada ("'309 Patent") discloses a reflective type screen comprising a reflective surface layer, a polarizing plate layer in position in front of the reflective surface layer, and a diffusion layer located in front of the polarized plate layer, wherein the reflective surface layer, the polarizing plate layer and the diffusion layer are laminated together using an adhesive to form an integral structure. Additional embodiments are disclosed in the '309 Patent, all of which require a polarizing layer, perhaps to accommodate exotic applications of projection images onto a screen.

U.S. Pat. No. 4,232,939 to Kikuchi ("'939 Patent") discloses a transparent base plate to which is attached on one side an aluminum mirror surface and on the other side a diffusing specular layer of low diffusing performance. The diffusing performance of the diffusing specular layer can be adjusted as desired while the reflection performance of the mirror surface is constant. The diffusing specular layer is formed with a plurality of elongated columnar lenticles having convex surfaces facing the viewer. The curvature of the lenticles is determined by the distance between the screen and the viewers. The outer convex surface of the lenticles is treated by sandblasting. The lenticles are arranged in a vertically elongated pattern, which sacrifices vertical directivity.

U.S. Pat. No. 4,201,449 to Campion ("'449 Patent") teaches a front projection screen having a substrate, a reflective aluminum ink coating applied to a surface of a substrate, and a protective coating, preferably of a clear acrylic having a gloss finish for the purpose of protecting the reflective film. The disclosure specifies that the coating reduces somewhat the reflective efficiency of the screen. Therefore, the directionality of such a screen is likely to be extremely narrow.

U.S. Pat. No. 4,190,320 to Ferro ("'320 Patent") teaches a front projection screen having two reflecting layers separated by a light transmissive layer, and a light-diffusing surface coating provided on the frontmost reflecting layer. The screen forms an embossed pattern across its front surface.

U.S. Pat. No. 4,089,587 to Schudel ("'587 Patent") discloses a projection screen having a film which is constructed of a partially deformable, resilient material. One surface of the film has in combination a random matte texture and a substantially unidirectional striated, i.e. grooved, texture. A layer of reflective material is deposited on the above-mentioned surface of the film to provide a high gain, damage resistant reflective surface. The screen of the '587 Patent is intended to be of the double-coverture type, i.e. curved about at least two axes so as to focus the reflected image in a confined area. Another embodiment of the '587 Patent discloses a flat screen. Striations are provided, usually vertically aligned to disburse the light reflected off of the reflective film. The arrangement of the striations or lenticles as vertical grooves limits the directionality to nearly a side-by-side viewing field and not top to bottom or diagonal.

SUMMARY OF THE INVENTION

It is therefore, an object of this invention to provide a front projection screen that overcomes the aforementioned disadvantages and shortcomings.

It is also an object of this invention to provide a front projection screen that provides the same directionality (i.e., directivity) along vertical as well as horizontal axes relative to a normal line passing perpendicularly through the center of the projection screen.

It is a further object of this invention to provide a projection screen that is simple and inexpensive to manufacture and light weight yet which provides directivity characteristics not heretofore experienced.

It is a further object of the present invention to provide an improved directivity projection screen that is flexible and capable of being rolled around a roller to form a composite and optionally portable projection screen system.

In accordance with these and other objects, the present invention is directed to a projection screen comprised of a reflective film laminated, as by the use of adhesive, metal deposition, or otherwise as will occur to those of skill in the art, to a light diffusing layer on one side and, on another side, as by adhesive, metal deposition, or other techniques known to those of skill in the art, to a substrate. The substrate may be rigid or flexible, flat or curved.

The reflective film may be vacuum metalized silver or vacuum metalized aluminum or any other film exhibiting a high coefficient of reflectivity. The characteristics of the light diffusing layer can be adjusted depending upon the desired effect, intensity of projected image light, ambient conditions, etc. One form of the diffusing layer is an embossed film. One form of such embossed film contains a plurality of concavities embossed in the film that act as micro lenses. The surface characteristics (e.g., concavities) associated with the light diffusing layer can be formed by techniques such as hot roll stamping, ultra etching or the like. Another form of such embossed film contains a plurality of irregularities on at least one surface thereof. Such irregularities are preferably in the form of a matte surface fabricated by rolling or comparable techniques.

The reflective layer may be adhered to the substrate or to the substrate-facing inner surface of the light diffusing layer.

It can therefore be appreciated that one embodiment of the invention is to a projection screen comprising a substrate having a generally flat forward surface; a diffusion layer formed of a plurality of generally equally spaced apart concave features forming micro lenses; a layer of reflective material deposited on a rearward facing surface of the diffusion layer; the diffusion layer laminated to the forward facing surface of the substrate so that the layer of reflective material is sandwiched there between.

These and other objects and features of the invention will be more readily understood from a consideration of the following detailed description, taken with the accompanying drawings, in which corresponding parts are indicated by corresponding numerals.

DETAILED DESCRIPTION OF THE PREFERRED EMBODIMENT

Figure 1:
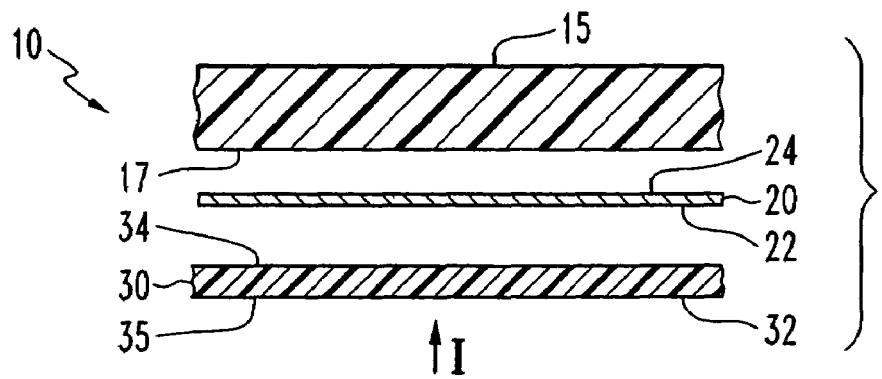
FIG. 1 is a cross-sectional, elevational, exploded view of a generalized embodiment of the invention.

Referring now to the drawings, the screen of the first embodiment of the invention is indicated by the reference numeral 10 and includes a substrate 15, which may be planar or curved depending upon the requirements of the particular application, and which, in the preferred embodiment, is of the rigid foam core variety with plastic sheet panels on both sides for rigidity. Although the screen of this invention can be used for any front projected image, it is particularly suitable for use with LCD projection or DLP and the like projection systems. The substrate is commonly found in, and is preferably in, the thickness range of between ¼ inch and 2 inches. The thickness of the substrate 15 is dictated by such parameters as strength requirements for a given size of screen, the environment in which the screen will be used, etc. The substrate defines a forward-facing or front surface 17.

A reflective, preferably metalized, film layer 20 is included, which defines a forward facing, reflective, surface 22 and a rear surface 24 adapted to be connected to or placed adjacent to, surface 17 of substrate 15.

A light diffusing layer 30 is employed which sandwiches the reflective layer 20 between light diffusing layer 30 and front surface 17 of substrate 15. Layer 30 defines a forward facing surface 32 and a rear facing surface 34. Rear surface 34 is disposed adjacent to forward surface 22 of reflective layer 20.

Reflective layer 20 may be adhered to rear surface 34 of light diffusing layer 30 by any suitable means, such as metallic deposition or using transparent adhesive, etc. If an adhesive is used, it should be an optically transparent formulated adhesive that is transparent to light. Reflective layer 20 may alternatively be applied to the rearward facing surface 34 of light diffusing layer 30 or to forward facing surface 17 of substrate 15 by vacuum metalization. The preferred materials which constitute layer 20 are silver or aluminum. Still further, reflective layer 20 may be a metal film such as aluminum, and may have a high polished mirror finish, a matte finish or any other surface treatment deemed desirable by one of skill in the art.

The light diffusing layer 30 is preferably fabricated of a resin such as polyethylene, polypropylene or other material which will permit light energy to enter through forward facing surface 32 and to be reflected by reflective layer 20 back through light diffusing layer 30 but in a manner which will increase the viewing angle of the reflected image such that the image can be seen from a wide angle relative to a line I representing a projected image light ray or wave projected at screen 10.

The higher the angle of diffusion, the wider the angle of viewing that will be perceived by those watching the image reflected by the screen. Normally, increasing the angle of diffusion results in a decrease in the luminance of reflected light. The make-up and physical contouring of light diffusing layer 30 is chosen so as to maximize the diffusion angle while also maximizing the luminance of reflected light. Simultaneously, the contrast of the reflected image should be kept as high as possible for greater picture clarity. An ideal range of thickness of light diffusing layer 30 is between 2–8 mils.

The ambient light characteristics, as well as the light intensity of the projected image, dictate the particular characteristics chosen for the light diffusing layer 30. Under conditions where less diffusion is required such as in a setting where the viewing angle does not need to be as great, polyethylene can be used as a constituent of light diffusing layer 30. For viewing settings where a greater angle of diffusion is desired, polypropylene can be used as a constituent of light diffusing layer 30. The forward surface 32, or the rearward surface 34, or both, of light diffusing layer 30 can be treated and/or contoured as by random embossing, micro lensing, sandblasting or any equivalent thereto indicated as reference number 35 in FIG. 1. Treatment 35 effects the magnitude of diffusion of the reflected image exiting light diffusing layer 30.

Figure 2:
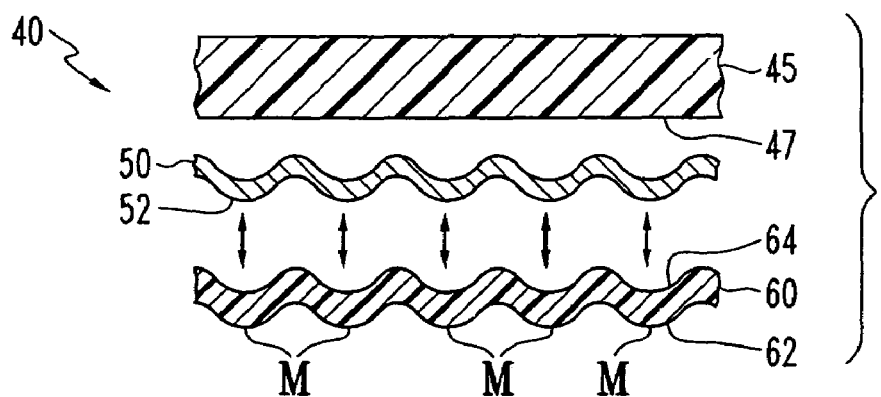
FIG. 2 is a cross-sectional, elevational, exploded view of an alternative embodiment of the invention.
Figure 3:
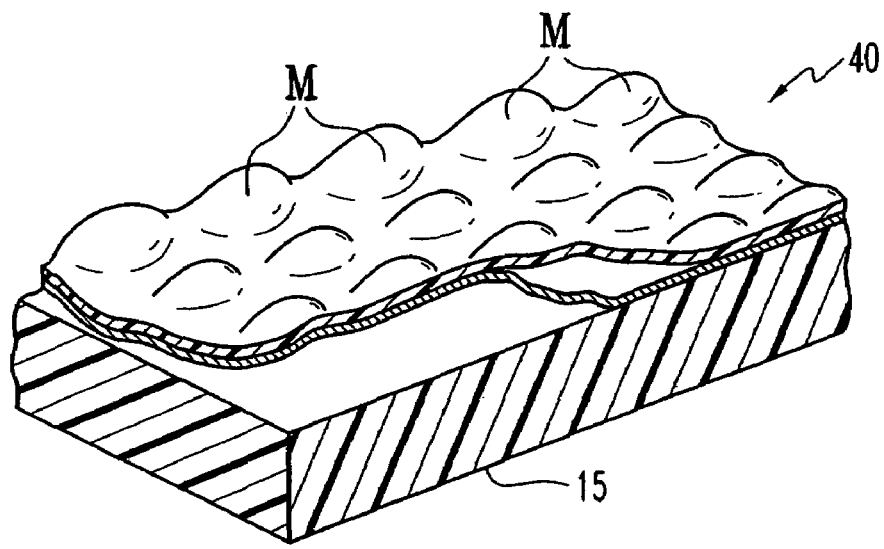
FIG. 3 is a perspective, partial cutaway, view of the alternative embodiment shown in FIG. 2.
Figure 4:
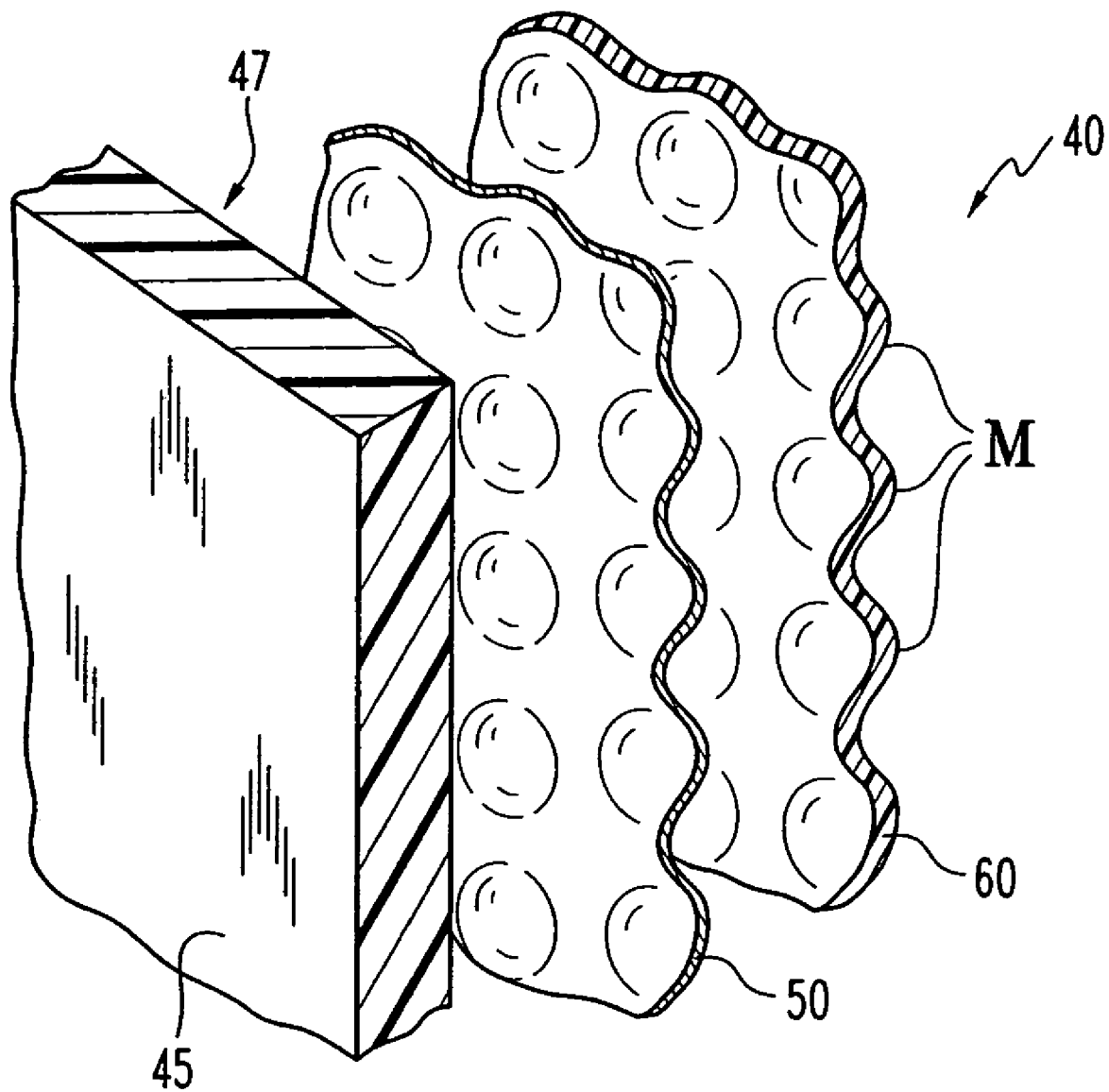
FIG. 4 is a perspective exploded partial cutaway view of the alternative embodiment of FIGS. 2 and 3.

As seen in FIGS. 2–4, an alternative or second embodiment of the invention comprises a front projection screen 40 in which a substrate 45, which may be similar to that described in connection with FIG. 1, is provided, and which defines a front surface 47. A reflective layer 50 is employed, also as disclosed in connection with FIG. 1, including forward facing reflective surface 52. A light diffusing layer 60 is employed, which defines forward surface 62 and rear surface 64. In this alternative embodiment, layer 60 defines a plurality of micro lenses M, which are, preferably, concavities in the shape of semi spheres, prisms, parabaloids, or any other raised structure which functions as a lens or prism with respect to light incident thereupon. Layer 50 may be laminated to inner surface 64 of light diffusing layer 60 (or to forward facing surface 47 of substrate 45) by a transparent adhesive (not shown), by vacuum deposition, or any other technique which will occur to one of skill in the art. Layer 50 may be made of any of the compositions discussed in connection with layer 20 of FIG. 1. Micro lenses M may be formed in light diffusing layer 60 by ultra etching, embossing, hot stamp rolling, or any other forming technique which will yield small lens-shaped concavities or solid embossed light-refracting elements therein. Micro lenses M may also be formed in other shapes, such as micro prisms, similar to those manufactured by Reflexsite Corporation.

The dimensions of the micro lenses such as a radius of curvature for curved lenses M, or the height and slope of sides if micro prisms are used, can be varied to effect the diffusion properties of diffusion layer 60. A larger radius of curvature, or a shallower slope, respectively, will yield smaller diffusion angles, and smaller radii of curvature, or steeper prism slopes, respectively will yield larger diffusion angles. For a home projection television, a higher diffusion angle is preferred, while in a movie theater setting a lower diffusion, higher concentrated, light reflectivity could be tolerated.

The luminance of reflected light (i.e., gain) of reflective layers 20 and 50 can be made lower for home television applications, while the same characteristics of screens 10, 40, respectively, can be increased for the commercial (e.g., movie theater) application.

It is to be understood that the particular surface treatments and/or contouring of light diffusing layers 30 and 60 herein can be brought about by any suitable means which will occur to one of skill in the art. The addition of protective films (not shown) over the outer surfaces 32, 62 of light diffusing layers 30, 60, respectively, is also contemplated to be within the scope of the invention, if desired.

Screens as disclosed herein are suitable for use in dark or full daylight conditions, and provide visual performance characteristics not hereto before known. It is to be understood that variations in materials and dimensions are contemplated to be within the scope of this invention without departing without the spirit hereof.

Figure 5:
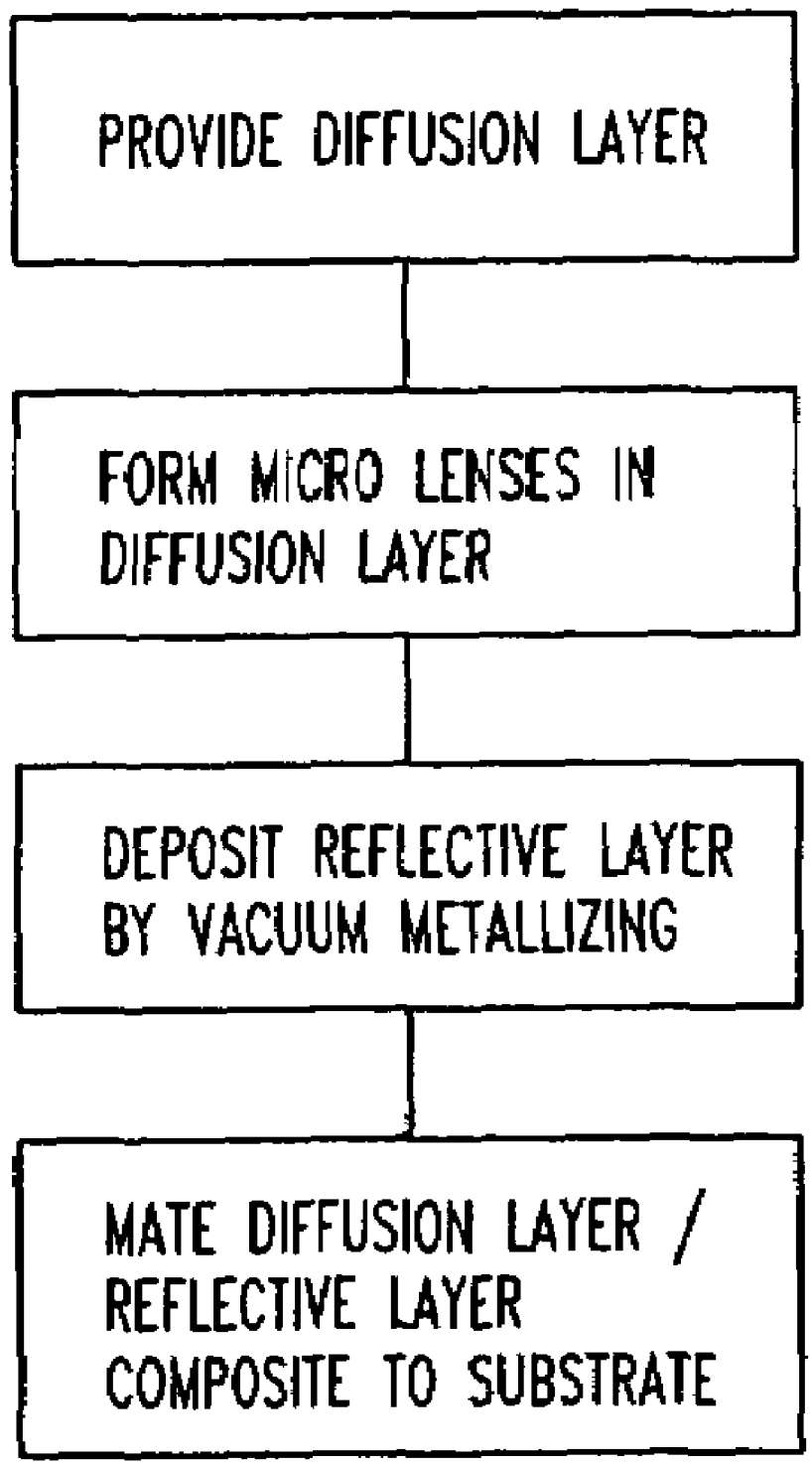
FIG. 5 is a flow diagram of the method of the invention.

A method, depicted schematically in FIG. 5, is also disclosed for creating the screen of this invention. The method comprises the steps of: providing a suitable diffusion layer; forming micro lenses in the diffusion layer; depositing the reflective layer thereon; and mating the diffusion layer/reflective layer composite to the substrate. In this way, very inexpensive yet high performance projection screens in conformance with the invention can be provided.

Figure 6:
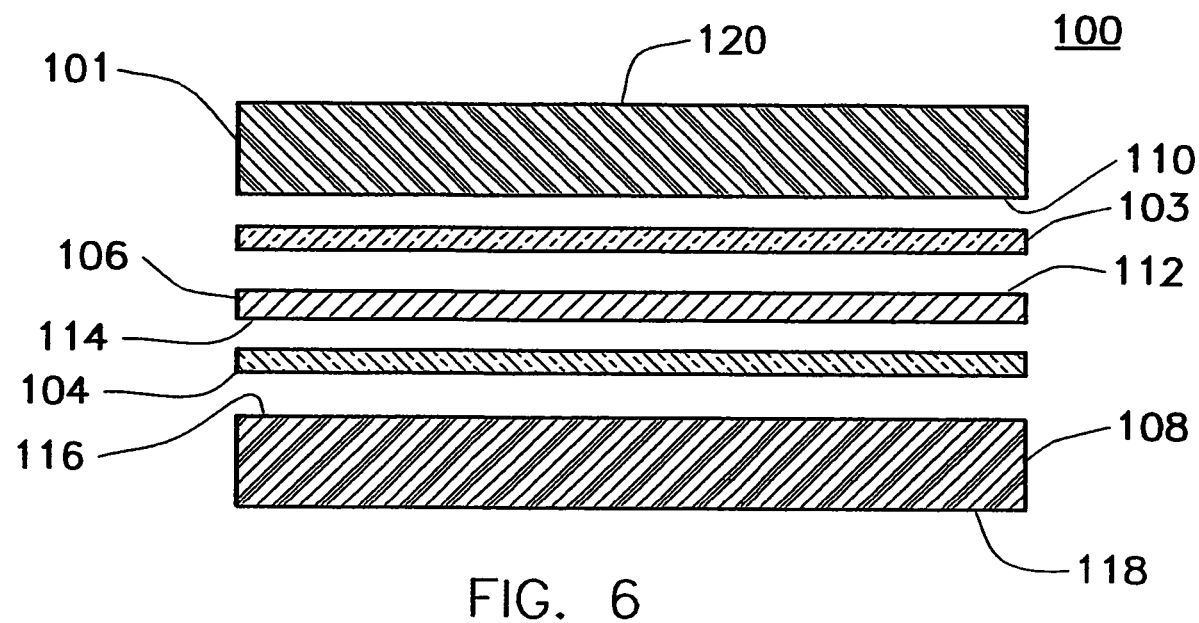
FIG. 6 is a cross-sectional, elevational, exploded view of a projection screen in accordance with another alternative embodiment of the present invention.

FIG. 6 is a cross-sectional, elevational, exploded view of an exemplary projection screen 100 in accordance with another alternative embodiment of the present invention. The projection screen 100 includes a substrate 101, two adhesive layers 103, 104, a reflective layer 106, and a diffusion layer 108. The substrate 101 is preferably flexible and constructed from polyvinylchloride (PVC) or some other comparable substrate material. The substrate 101 has a thickness preferably in the range of approximately five (5) mils to approximately eight (8) mils. The thickness of the substrate 101 is dictated by parameters such as strength requirements for a given size of the projection screen 100, the environment in which the projection screen 100 will be used, and the desired flexibility of the projection screen 100. Similar to the substrates 15, 45 of FIGS. 1–4, the substrate 101 of FIG. 6 defines a forward-facing or front surface 110. The substrate 101 may also define an opposed rear surface 120 that may be optionally secured by any conventional method to a rigid substrate depending on the desired use of the projection screen 100.

The reflective layer 106 is preferably substantially identical to reflective layer 20 disclosed above with respect to FIG. 1. Accordingly, the reflective layer 106 preferably comprises a metallic film, such as a film or foil of aluminum, and has a thickness in the range of approximately $\frac{1}{3}$ mil to one (1) mil. When commercial grade aluminum foil is used as the reflective layer 106, such foil typically includes two opposed surfaces 112, 114 having different reflectivity characteristics. For example, as noted above with respect to reflective layer 20, one surface of the reflective layer 106 may have a high polished mirror finish and the other surface may have a matte finish. Depending on the desired brightness of the image displayed on the projection screen 100, a surface with either finish may serve as the front surface 114 and be attached to the diffusion layer 108 as discussed in more detail below. For example, when a brighter image is desired, the surface of the reflective material having the greater reflectivity is used as the front surface 114 of the reflective layer 106. On the other hand, when a duller image is desired, the surface of the reflective material having the lesser reflectivity is used as the front surface 114 of the reflective layer 106.

Figure 7:
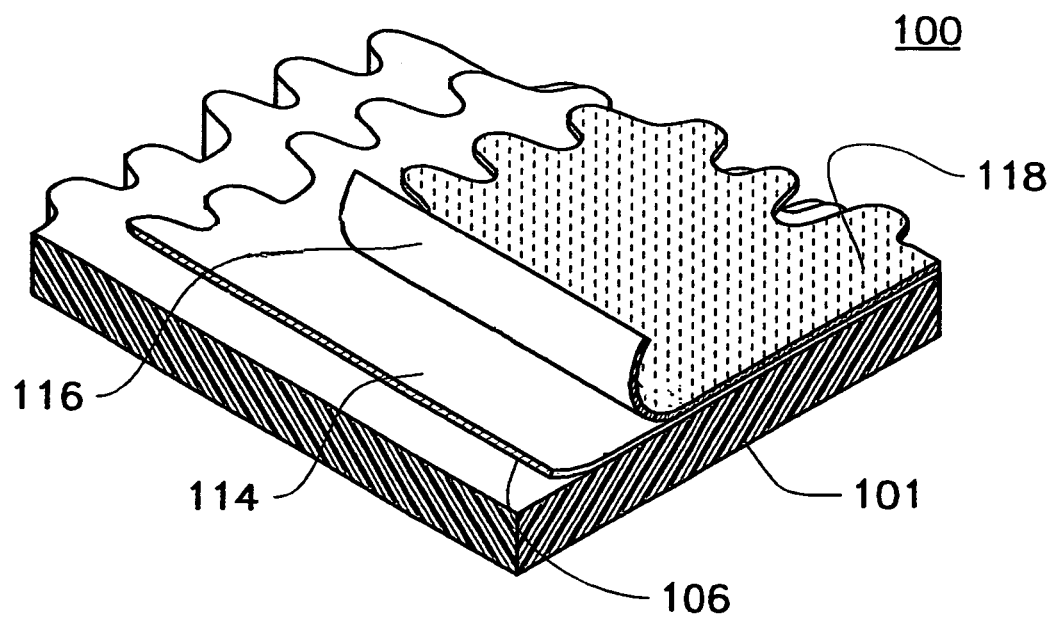
FIG. 7 is a perspective, partial cutaway, view of the alternative projection screen shown in FIG. 6.

The diffusion layer 108 is preferably substantially identical to diffusion layer 30 of FIG. 1 and, therefore, is preferably fabricated from a resin, such as polypropylene or polyethylene. The thickness of the diffusion layer 108 is greater than one (1) mil and is preferably in the range of approximately two (2) mils to eight (8) mils, as is the thickness of diffusion layer 30 disclosed above. The diffusion layer 108 includes a front surface 118 and an opposed rear surface 116. The front surface 118 of the diffusion layer 108 preferably includes a plurality of irregularities, such as those used to form a matte finish as illustrated in exemplary form in FIG. 7. The matte finish or other irregularities may be fabricated using a press roller or any other conventional technique. The rear surface 116 of the diffusion layer 108 preferably includes a substantially smooth finish, but may alternatively include a matte or other finish, or other irregularities, depending on the desired diffusion characteristics of the diffusion layer 108.

The adhesive layers 103, 104 are preferably very thin (e.g., in the range of about ¼ to ½ mil) and are fabricated from a commercially-available optically transparent adhesive. In alternative embodiments, different adhesives in different thicknesses may be used for the adhesive layers 103, 104; however, use of an optically transparent adhesive is preferred for adhesive layer 104. Adhesive layer 103 functions to attach the front surface 110 of the substrate 101 to the rear surface 112 of the reflective layer 106. Adhesive layer 104 functions to attach the front surface 114 of the reflective layer 106 to the rear surface 112 of the diffusion layer 108. Reflective layer 106 may alternatively be applied to the rear surface 116 of the diffusion layer 108 and/or to the front surface 110 of the substrate 101 by vacuum metalization or other conventional techniques, instead of using adhesives. In such a case, the adhesive layers 103, 104 would not be used to form the projection screen 100.

When constructed with the substrate 101, the reflective layer 106, the diffusion layer 108 and the adhesive layers 103, 104 as described above, the projection screen 100 has a thickness preferably in the range of approximately eight mils (8) to approximately twenty (20) mils. In addition, when so constructed, the projection screen 100 is sufficiently flexible to enable it to be wound around a roller during periods of non-use and then expanded during periods of use. Moreover, as confirmed through experiments conducted on the above-described projection screen 100, use of a matte finish on the front surface 118 of the diffusion layer 108 causes the directivity along a vertical axis relative to a normal line passing perpendicularly through a center of the projection screen 100 to be substantially the same as the directivity along a horizontal axis relative to such normal line, thereby providing enhanced directionality as compared to prior art screens.

Figure 8:
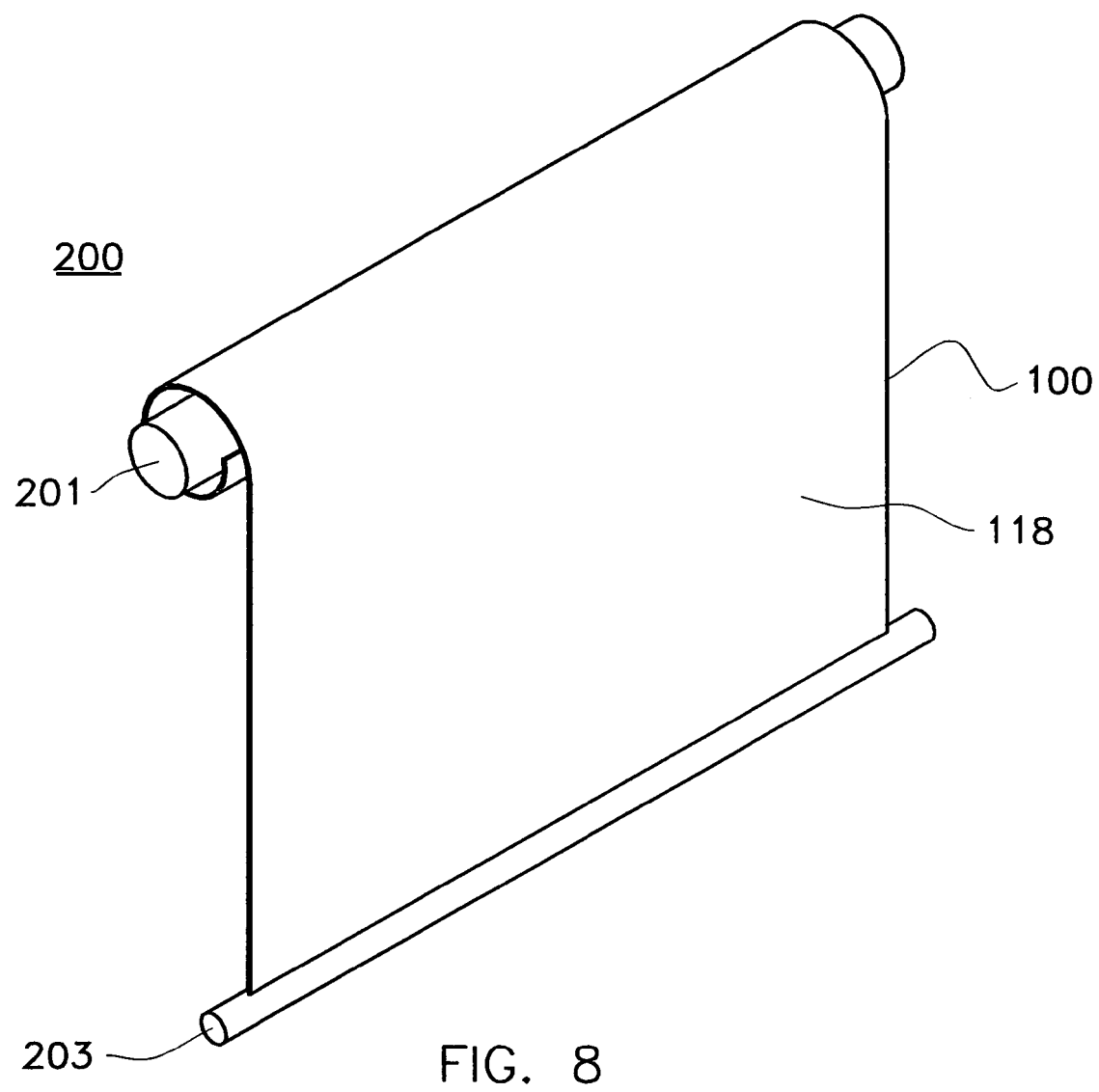
FIG. 8 is a perspective view of a projection screen system in accordance with a further alternative embodiment of the present invention.

FIG. 8 is a perspective view of a projection screen system 200 in accordance with a further alternative embodiment of the present invention. As depicted, the projection screen system 200 preferably includes the above-described projection screen 100, a roller 201, and an optional bar or tube 203. The roller 201 and optional bar 203 are conventional devices used in various commercially available front projection screens, such as the "Lectric I" projection screen which is available from Vutec Corporation of Pompano Beach, Fla. The bar 203 may be used to aid in raising and lowering, or more generally opening and closing, the projection screen 100, and may include an attached handle (not shown). In the system 200 depicted in FIG. 2, the projection screen 100 is wound around the roller 201 for storage when the projection screen 100 is not in use. In such system 200, the rear surface 120 of the substrate 101 is preferably adjacent the roller 201 when the projection screen 100 is wound around the roller 201, thereby preventing the viewing surface 118 of the screen 100 from contacting the roller 201 when the projection screen 100 is closed and stored. The projection system 200 may form part of a fixed system (e.g., in a conference room or classroom) or may comprise part of a portable system as desired by the user.

Various modifications and alterations of this invention will become apparent to those skilled in the art without departing from the scope and spirit of this invention, and it is understood that this invention is not limited to the illustrative embodiments set forth hereinbefore.

What is claimed is:

1. A projection screen comprising:
   a substrate having at least a first surface;
   a reflective layer having a first surface and an opposing second surface, the second surface of the reflective layer being attached to the first surface of the substrate, the second surface of the reflective layer having greater reflectivity than the first surface of the reflective layer; and
   a diffusion layer attached to the first surface of the reflective layer.

2. The projection screen of claim 1, wherein the reflective layer comprises a film of aluminum.

3. The projection screen of claim 1, wherein the reflective layer comprises a layer of aluminum foil, wherein the first surface of the reflective layer has a polished finish, and wherein the second surface of the reflective layer is not polished.

4. The projection screen of claim 3, wherein the second surface of the reflective layer has a matte finish.

5. The projection screen of claim 1, wherein the diffusion layer is a resin.

6. The projection screen of claim 5, wherein the resin is one of polyethylene and polypropylene.

7. The projection screen of claim 1, further comprising an optically transparent adhesive that attaches the second surface of the diffusion layer to the first surface of the reflective layer.

8. The projection screen of claim 1, further comprising an adhesive that attaches the first surface of the substrate to the second surface of the reflective layer.

9. The projection screen of claim 1, wherein the diffusion layer has a thickness greater than one one-thousandth of an inch (one mil).

10. The projection screen of claim 9, wherein the thickness of the diffusion layer is in the range of approximately two mils to approximately eight mils.

11. The projection screen of claim 1, wherein the substrate comprises polyvinylchloride and has a thickness in the range of approximately five mils to approximately eight mils.

12. The projection screen of claim 1, wherein the reflective layer has a thickness in the range of approximately one-third of a mil to approximately one mil.

13. The projection screen of claim 1, wherein a combined thickness of the substrate, the reflective layer, and the diffusion layer is in the range of approximately eight mils to approximately twenty mils.

14. The projection screen of claim 1, wherein the substrate is sufficiently flexible to enable the projection screen to be wound around a roller during periods of non-use.

15. The projection screen of claim 1, wherein the second surface of the diffusion layer has a substantially smooth finish.

16. The projection screen of claim 1, wherein the diffusion layer includes a first surface defined by a matte finish and an opposing second surface, and wherein the second surface of the diffusion layer is attached to the first surface of the reflective layer.

17. The projection screen of claim 1, wherein at least one of the reflective layer and the diffusion layer includes a plurality of micro lenses.

18. The projection screen of claim 17, wherein the micro lenses are generally equally spaced apart.

19. The projection screen of claim 17, wherein the micro lenses are concave.

20. The projection screen of claim 17, wherein the micro lenses are convex.

21. A projection screen system comprising:
a projection screen that includes:
a substrate having at least a first surface;
a reflective layer having a first surface and an opposing second surface, the second surface of the reflective layer being attached to the first surface of the substrate, the second surface of the reflective layer having greater reflectivity than the first surface of the reflective layer; and
a diffusion layer attached to the first surface of the reflective layer; and
a roller around which the projection screen is wound when the projection screen is not in use.

22. The projection screen system of claim 21, wherein the reflective layer comprises a layer of aluminum foil, wherein the first surface of the reflective layer has a polished finish, and wherein the second surface of the reflective layer is not polished.

23. The projection screen system of claim 22, wherein the second surface of the reflective layer has a matte finish.

24. A projection screen comprising:
a flexible substrate having at least a first surface and a thickness of approximately five mils to approximately eight mils;
a metallic layer having a first surface and an opposing second surface and having a thickness in the range of approximately one-third of a mil to approximately one mil, the second surface of the metallic layer having greater reflectivity than the first surface of the metallic layer;
a first adhesive layer, positioned between the flexible substrate and the metallic layer, that attaches the second surface of the metallic layer to the first surface of the substrate;
a diffusion layer having a first surface defined by a matte finish and an opposing second surface defined by a substantially smooth finish, the diffusion layer further having a thickness in the range of approximately two mils to approximately eight mils; and
a second, optically transparent adhesive layer, positioned between the metallic layer and the diffusion layer, that attaches the second surface of the diffusion layer to the first surface of the metallic layer.

25. A projection screen comprising:
a substrate defining a first surface;
a reflective layer coupled to the first surface of the substrate, wherein the reflective layer has a first surface and an opposing second surface, the second surface of the reflective layer
a diffusion layer coupled to the reflective layer such that the reflective layer is positioned between the substrate and the diffusion layer, the diffusion layer having a thickness greater than one one-thousandth of an inch (one mil);
wherein at least one of the reflective layer and the diffusion layer includes a plurality of micro lenses.

26. The projection screen of claim 25, wherein the reflective layer comprises a layer of aluminum foil, wherein the second surface of the reflective layer has a polished finish, and wherein the first surface of the reflective layer is not polished.

27. The projection screen of claim 26, wherein the first surface of the reflective layer has a matte finish.

28. A projection screen system comprising:
a projection screen that includes:
a substrate defining a first surface;
a reflective layer coupled to the first surface of the substrate, wherein the reflective layer has a first surface and an opposing second surface, the second surface of the reflective layer being attached to the first surface of the substrate, the second surface of the reflective layer having greater reflectivity than the first surface of the reflective layer; and
a diffusion layer coupled to the reflective layer such that the reflective layer is positioned between the substrate and the diffusion layer, the diffusion layer having a thickness greater than one one-thousandth of an inch (one mil);
wherein at least one of the reflective layer and the diffusion layer includes a plurality of micro lenses; and being attached to the first surface of the substrate, the second surface of the reflective layer having greater reflectivity than the first surface of the reflective layer; and
a diffusion layer coupled to the reflective layer such that the reflective layer is positioned between the substrate and the diffusion layer, the diffusion layer having a thickness greater than one one-thousandth of an inch (one mil);
wherein at least one of the reflective layer and the diffusion layer includes a plurality of micro lenses.

29. The projection screen system of claim 28, wherein the reflective layer comprises a layer of aluminum foil, wherein the second surface of the reflective layer has a polished finish, and wherein the first surface of the reflective layer is not polished.

30. The projection screen system of claim 29, wherein the first surface of the reflective layer has a matte finish.

31. A projection screen comprising:
a substrate defining a first surface;
a reflective layer coupled to the first surface of the substrate, wherein the reflective layer has a first surface and an opposing second surface, the second surface of the reflective layer being attached to the first surface of the substrate, the first surface of the reflective layer having greater reflectivity than the second surface of the reflective layer; and
a roller around which the projection screen is wound when the projection screen is not in use.

32. A projection screen system comprising:
a projection screen that includes:
a substrate defining a first surface;
a reflective layer coupled to the first surface of the substrate, wherein the reflective layer has a first surface and an opposing second surface, the second surface of the reflective layer being attached to the first surface of the substrate, the first surface of the reflective layer having greater reflectivity than the second surface of the reflective layer; and
a diffusion layer coupled to the reflective layer such that the reflective layer is positioned between the substrate and the diffusion layer, the diffusion layer having a thickness greater than one one-thousandth of an inch (one mil);
wherein at least one of the reflective layer and the diffusion layer includes a plurality of micro lenses; and
a roller around which the projection screen is wound when the projection screen is not in use.

* * * * *